United States Patent [19]
Furihata

[11] 3,897,775
[45] Aug. 5, 1975

[54] ENDOSCOPE WITH FACILE BENDING OPERATION

[75] Inventor: Hiroyuki Furihata, Tokyo, Japan

[73] Assignee: Olympus Optical Company, Ltd., Tokyo, Japan

[22] Filed: Aug. 19, 1974

[21] Appl. No.: 498,462

[30] Foreign Application Priority Data
Aug. 30, 1973 Japan............................ 48-101038

[52] U.S. Cl. ............................ 128/6; 128/DIG. 9
[51] Int. Cl. ............................................. A61b 1/00
[58] Field of Search ........................ 128/4–8, 2 M, 128/DIG. 9; 350/69, 70; 356/241; 95/11 HC; 74/479, 491, 519, 555

[56] References Cited
UNITED STATES PATENTS

| | | | |
|---|---|---|---|
| 3,416,531 | 1/1964 | Edwards | 128/DIG. 9 |
| 3,610,231 | 10/1971 | Takahaski | 128/6 |
| 3,788,303 | 1/1974 | Hall | 128/4 |

Primary Examiner—Richard A. Gaudet
Assistant Examiner—Henry S. Layton
Attorney, Agent, or Firm—Ostrolenk, Faber, Gerb & Soffen

[57] ABSTRACT

An endoscope comprises a control unit and a distal end portion which are connected together by a flexible tube including a bending section, through which flexure controlling wires are passed with their one end connected to the distal end portion and their other end connected to pulleys internally housed within the control unit. The terminal portion of the pulley shafts projecting externally of the control unit has flexure controlling levers fixed thereon, which are extended and folded to reach the surface of the control unit which is immediately adjacent to the surface thereof through which the pulley shafts project, with knurled knobs attached to their free ends. The knurled knobs are adapted to be manipulated by the thumb of the hand which is used to grasp the control unit, and adapted to move lengthwise of the control unit to turn the pulleys for oscillating the distal end portion.

11 Claims, 7 Drawing Figures

ENDOSCOPE WITH FACILE BENDING OPERATION

BACKGROUND OF THE INVENTION

The invention relates to an endoscope which permits an easy bending operation of the distal end portion.

An endoscope of the type is known which includes a control unit housing the eyepiece assembly of an observation optical system, and a distal end portion housing the objective assembly of the observation optical system, both of which are connected together by a flexible tube having a bending section adjacent its end nearer the distal end portion and through which an optical fiber bundle is housed to provide a coupling between the eyepiece and objective assemblies of the observation optical system, the bending section being operated by a suitable bending means to oscillate the distal end portion in a desired manner. In an endoscope of this type, the bending means typically comprises flexure controlling wires passed through the flexible tube and having their one end fixed to the distal end portion and their other end secured to pulleys which are disposed in the control unit so that the pulleys may be turned in a suitable manner to apply a tensioning or loosening alternately to the flexure controlling wires to flex the bending section.

Referring to FIG. 1 which shows part of a conventional endoscope, a control unit 1 is usually in the form of a quadrangular prism having one surface 1a on which knobs 2 and 3 for controlling the flexure in the vertical or up-and-down direction and in the lateral direction, respectively, are mounted. In the prior art practice, the knobs 2 and 3 had to be mounted on the shafts of pulleys which have their end face disposed parallel to the surface 1a, so that the both knobs 2 and 3 had to be located on the surface 1a. Also mounted on the surface 1a of the control unit 1 are locking levers 4 and 5 which are used to lock the knobs 2 and 3 at suitable positions. At one longitudinal end, the control unit 1 is provided with the eyepiece assembly 6 of an observation optical system, while its other end is connected with a flexible tube 7 which internally houses an optical fiber bundle or the like. An air and liquid supply button 8 and a suction button 9 are mounted on one of the surfaces, 1b, immediately adjoining the surface 1a of the control unit, and a conduit 10 having an inlet 10a for passing a processing instrument such as forceps, cell collecting brush or the like extends through this surface. The surface of the control unit which is located opposite to the surface 1b is connected with a general purpose flexible tube 11 which may be used for housing an illumination optical fiber bundle for connection with a light source.

In the endoscope as shown in FIG. 1, the location of the flexure controlling knobs 2 and 3 on the surface 1a of the control unit 1, through which the pulley shafts extend, involved difficulties when a bending operation of the endoscope is attempted in connection with other operations such as the rotation of the entire endoscope, air and/or liquid supply operation, passing and tilting operation of a processing instrument such as forceps or the like.

In general, the use of the endoscope includes the following operations:

a. The distal end portion and part of the flexible tube 7 are inserted into an internal organ, and the distal end portion is moved close to a part to be examined;

b. The entire endoscope is rotated about the longitudinal center line of the control unit 1 in order to direct the objective assembly of the observation optical system toward a part to be examined;

c. Flexure control knobs 2, 3 are turned to flex the bending section to oscillate the distal end portion so that the objective assembly of the observation optical system may be aligned with a part to be examined;

d. The eyepiece assembly 6 on the control unit is adjusted to provide a focussing operation;

e. The light source of the illumination optical system is adjusted to a proper brightness and color temperature for the purpose of observing a part to be examined;

f. One of processing instruments such as forceps, cell collecting brush or the like is passed into the conduit 10 to bring its tip close to a part to be examined;

g. Air and liquid supply button 8 and suction button 9 connected with an air and liquid supply device and suction means, respectively, are operated to feed a processing solution such as washing solution to a part to be examined through the operation of the button 8, withdrawing liquid from the internal organ by operation of the suction button 9, or the interior of the internal organ is dried or inflated by the supply of an air;

h. The tip of a processing instrument is tilted by a tilt controlling member located on the control unit 1 to treat a part to be examined;

i. A camera associated with the endoscope is adjusted for taking pictures of a part to be examined; and j. Upon completion of these operations, the endoscope and/or processing instrument is withdrawn.

These operations are usually performed in combination, and must be completed efficiently in order to minimize the period of clinical examination and the pains suffered by a patient and also to relieve an operator so that an inadvertent operation may be avoided.

In the interest of saving labor, it is desirable that the endoscope be designed so as to permit one person to perform almost all of the above operations. When a single operator is required to perform the various operations of the endoscope, it will be appreciated that a satisfactory human engineering will be achieved when the operations (a), (b), (c), (g), (h) and (j) are performed by a hand which is used to grasp the control unit 1 while the remaining operations (d), (e), (f) and (i) are performed by the other hand. Thus, in order to enhance the maneuvrability, it is necessary that various knobs and buttons be optimized to the hand which grasps the control unit 1. In particular, the bending operation (c) is performed most frequently, so that particular consideration must be paid to the flexure controlling knobs.

Referring back to FIG. 1 showing the conventional endoscope in which the flexure controlling knobs 2 and 3 are mounted on the surface 1a of the control unit 1 through which the pulley shafts extend, it will be noted that if the knobs 2, 3 are conveniently located and constructed for operation by the thumb of the right hand, it will be difficult to operate these knobs by the thumb of the left hand, thus imposing a limitation on the hand which can be used to grasp the control unit 1, and preventing the possibility that the operations (a), (b), (c) and the like may be performed by either hand. Even if a construction is made such that the hand grasping the control unit 1 can be used to engage the flexure controlling knobs simultaneously, the resulting operation will be very troublesome, leaving much to be desired.

To overcome such a disadvantage, there has been an alternative arrangement of the endoscope as shown in FIG. 2, in which a flexure controlling knob 20 is located within an elongate slot 21a. Referring to FIG. 2 a control unit 21 is provided with four flat areas around its periphery, and the elongate slot 21a is formed centrally in one of the surfaces 21b, so as to extend longitudinally thereof. The length of the slot is sufficient to permit a pivotal movement of the flexure controlling knob 20 therein. The flexure controlling knob 20 has a shank which extends through the elongate slot 21a and is fixed to a pulley shaft at right angles thereto. The pulley shaft extends substantially parallel to the surface 21b and the knob 20 is situated substantially at the center of the surface 21b of the control unit 21, so that the knob can be satisfactorily operated by the thumb of either hand which grasps the control unit 21. It is noted that a conduit 22 having an inlet 22a for a processing instrument extends through the control unit in the vicinity of the knob 20, and that the control unit 21 is provided with the eyepiece assembly 23 of an observation optical system at its one end and is connected with a flexible tube 24 at its other end. A general purpose flexible tube 25 is connected with the surface immediately adjoining the surface 21b of the control unit 21.

The endoscope illustrated in FIG. 2 also involves certain drawbacks. One of the drawbacks is the fact that the elongate slot 21a must be provided to receive the knob 20, which provision detracts from the sealing integrity. Because the endoscope is intended to be used for the examination of a number of patients, it must be washed and sterilized against the infection by germs each time it is used with a patient. Therefore, it is desirable that various parts including the control unit be completely sealed to prevent the ingress of any liquid into its interior, but the endoscope illustrated in FIG. 2 is unsatisfactory in this respect.

Another disadvantage results from the fact that the knob 20 is secured to the pulley shaft at right angles thereto with a shank having a relatively short overall length. Consequently, a relatively high force is required to drive the pulley, with consequence that the construction of this flexure controlling knob 20 is not suitable for a large size endoscope intended for the examination of stomach or intestines or an endoscope in which the distal end portion is to be oscillated in a three dimensional manner, even though it may be tolerated for a small size endoscope intended for the inspection of vocal chords or pediatrics and in which the distal end portion is only oscillated in a two dimensional manner.

SUMMARY OF THE INVENTION

Therefore, it is an object of the invention to provide an endoscope which permits an easy bending operation in connection with other operations with a thumb of either right or left hand which grasps a control unit.

In accordance with the invention, flexure controlling levers are connected with pulley shafts and extend onto a surface of a control unit which is adjacent to the surface through which the pulley shafts extend, thus providing an increased length. Knurled knobs are attached to the free ends of the levers to permit an easy engagement by the thumb, for example, of a hand, either right or left, which is used to grasp the control unit. This removes any limitation on the hand which is used to operate the endoscope, but whichever hand grasps the control unit may be used to perform a bending operation.

The requirement for one hand for the bending operation while grasping the control unit with the other hand is avoided. In addition, the increased length of the flexure controlling levers is advantageous to a high load endoscope intended for the examination of stomach or intestines or an endoscope in which a free dimensional oscillating motion is required.

The endoscope according to the invention permits all of the operations (a), (b), (c), (g), (h) and (j) to be performed by the hand which is used to grasp the control unit. Additionally, no slots are required in the control unit for permitting an operation of the flexure controlling lever, and thus the sealing integrity of the control unit is assured, which enables it to be subjected to a severe washing and sterilizing operation without damaging the internal mechanism.

DETAILED DESCRIPTION OF THE PREFERRED EMBODIMENTS

Figure 3:
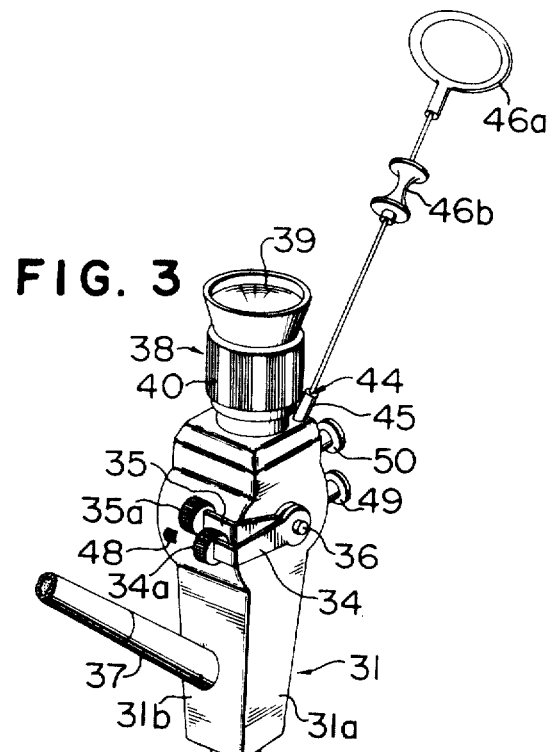
FIG. 3 is a perspective view of the endoscope according to one embodiment of the invention.

Referring to FIG. 3, there is shown a gastroendoscope according to one embodiment of the invention which is adapted to have its distal end portion oscillated in a three dimensional manner. The endoscope includes a control unit 31 and a distal end portion 32 which are connected together by a flexible tube 33 having a bending section 33a at its end adjacent to the distal end portion 32. The control unit 31 is in the form of a quadrangular prism, four-sided body, and flexure controlling levers 34, 35 have their base end rotatably mounted on a central upper portion of one surface 31a thereof by means of a set screw 36. A general purpose flexible tube 37 is connected to a surface 31b of the control unit which adjoins with the surface 31a on the left-hand side thereof, as viewed in FIG. 3. The flexure controlling levers 34, 35 extend along the surface 31a, and are bent at the edge thereof to extend along the surface 31b. These levers 34, 35 have different lengths, the lever 35 being slightly longer, and their free ends fixedly carry knurled knobs 34a, 35a. The differential length of the flexure controlling levers 34, 35 facilitate their operation.

At the top, as viewed in FIG. 3, the control unit 31 is provided with an eyepiece assembly 38 for an observation optical system. This assembly includes an eyepiece 39 at its top, and also includes a focussing ring 40 in its lens barrel. The eyepiece assembly 38 is connected with an objective window 41 by an optical fiber bundle, not shown, contained within the flexible tube 33. An illumination window 42 is provided in the distal end portion 32 adjacent to its tip, and is connected with a light source, not shown, through an illumination optical system received within the distal end portion 32 and through an illumination optical fiber bundle, not shown, which passes through the flexible tube 33, control unit 31 and general purpose flexible tube 37. When the distal end portion 32 and the flexible tube 33 of this endoscope are inserted into an internal organ such as the stomach, a part of the organ to be examined is illuminated by light emitted through the illumination window 42, and can be observed at the eyepiece assembly 38 through the objective window 41 and the observation optical system. It will be noted that a camera can be mounted on the eyepiece assembly to take pictures of the part to be examined.

An outlet 43 for a processing instrument such as forceps 46, cell collecting brush or the like is located in the distal end portion 32 at a position more removed from the tip thereof than the objective window 41, and communicates with a conduit 45 which passes through the flexible tube 33 and forms an inlet 44 for the processing instrument by projecting through the control unit 31 at a position adjacent to the eyepiece assembly 38. A forceps 46 extends through the conduit 45, and is provided with an operating handle 46a and a finger stop 46b which can be operated to open or close the forceps 46. A tilt controlling member 47 is located within the outlet 43 and is connected with an operating knob 48 provided on the surface 31b of the control unit 31 through a wire, not shown, which is passed through the flexible tube. When the operating knob 48 is operated in a suitable manner, the forceps 46 can be tilted between the solid line position shown and a position 46A shown in phantom lines.

Figure 1:
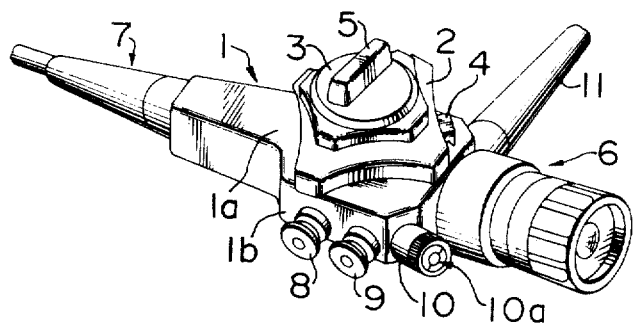
FIGS. 1 and 2 are perspective views illustrating part of conventional endoscopes.
Figure 2:
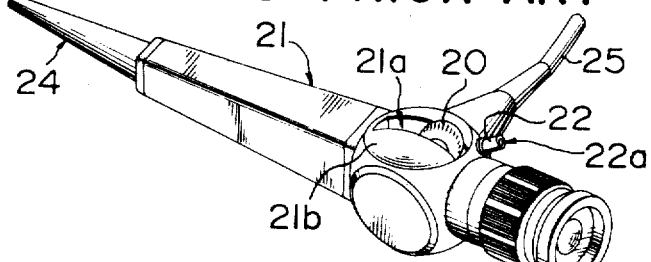
Figure 4:
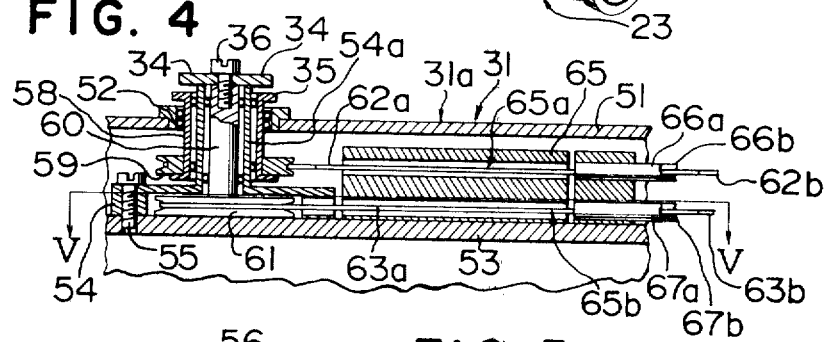
FIG. 4 is a cross section of the endoscope according to the invention, illustrating the construction of part of the control unit.
Figure 5:
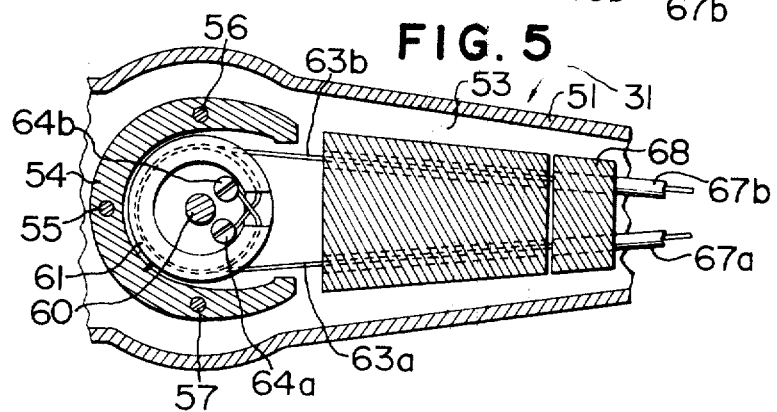
FIG. 5 is a cross section taken along the line V-V shown in FIG. 4.

Referring to FIG. 3, on the surface of the control unit which is located opposite to the surface 31b are provided an air and liquid supply button 49 and a suction button 50, which form part of the air and liquid supply and the suction unit for the conduit 45. The operation of the buttons 49 and 50 are coupled through the general purpose flexible tube 37 to an air supply pump, a liquid supply vessel and a suction tank (not shown) for supplying air or liquid or applying suction through the conduit 45 and the outlet 43 located at the distal end portion 32. Referring to FIG. 4, the control unit 31 comprises a housing 51 in which a bearing 52 is secured. The housing 51 also includes an internally located support plate 53 on which a pulley holding frame 54 is fixedly mounted by means of screws 55, 56 and 57 (see FIG. 5). On the upper side, as viewed in FIG. 4, the pulley holding frame 54 is provided with a cylindrical, upright section 54a, and a hollow shaft 58 is rotatably fitted between the upright section 54a and the bearing 52, using suitable bearing means. An up-down bending pulley 59 is secured to the lower portion, as viewed in FIG. 4, of the hollow shaft 58. A shaft 60 is rotatably mounted inside the upright section 54a of the pulley holding frame 54 by means of suitable bearing means, and extends through the pulley holding frame, with its lower end having a lateral bending pulley 61 secured thereon. Flexure controlling wires 62a, 62b, 63a and 63b have their one end secured to the pulleys 59 and 61. By way of example, FIG. 5 shows that wires 63a and 63b have their one end wrapped around pulley 61 and their terminal end secured thereto by set screws 64a and 64b, respectively.

The wires 62a and 62b having their one end secured to the pulley 59 extend through bores 65a formed in an anchoring block 65 which is secured to the support plate 53, and subsequently extend through pipes 66a and 66b, respectively. On the other hand, the wires 63a and 63b having their one end secured to the pulley 61 extend through bores 65b formed in the anchoring block 65, and subsequently extend through pipes 67a and 67b, respectively. The respective pipes 66a, 66b, 67a and 67b have their ends nearer the control unit 31 held stationary by a separate anchoring block 68 which is also secured to the support plate 53, and have their other ends secured to a reinforcement (not shown) at that end of the bending section 33a which is located nearer the control unit 31 after passing through the flexible tube 33. Each of the wires 62a, 62b, 63a and 63b extends through respective ones of each of the pipes 66a, 66b, 67a or 67b to reach the bending section 33a where it extends through a tubular bending member (not shown) which forms the framework within the bending section 33a, before having its other end secured to a tubular member 69 at the distal end portion 32, as shown in FIG. 6.

Figure 6:
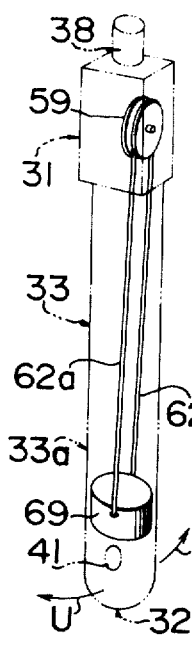
FIGS. 6 and 7 are perspective views illustrating the relationship between the pulleys, wires and the distal end portion in the endoscope according to the invention.

The flexure controlling wires 62a and 62b are secured to the tubular member 69 in a manner such that when the pulley 59 is rotated, the distal end portion 32 moves in an up-down direction or the direction indicated by arrows U and D shown in FIGS. 3 and 6. The flexure controlling wires 63a and 63b are similarly secured to the tubular member 69 in a manner such that when the pulley 61 is rotated, the distal end portion 32 moves in a lateral direction or in the direction indicated by arrows R and L shown in these Figures. In the specification and the claims, the term "up-and-down direction" as may be used in a description that the distal end portion 32 moves in the up-and-down direction refers to the direction of a movement of the distal end portion 32 along a plane which is perpendicular to the plane of the objective window 41, the "up" direction being in alignment with the direction as viewed forwardly through the objective window 41 and the "down" direction being directed toward the back side of the objective window 41. Similarly, the term "lateral direction" as may be used in a description that the distal end portion 32 moves in a lateral direction refers to the direction of a movement of the distal end portion 32 along a plane which is substantially parallel to the plane of the objective window 41, the "right" implying a movement to the right as viewed from the control unit 31 and the "left" being a movement to the left, as viewed from the control unit 31.

When the knob 34a associated with the lever 34 and the knob 35a associated with the lever 35 assume their central positions as shown in FIG. 3, no flexure will occur in the bending section 33a, so that the distal end portion 32 extends as a straight extension from the forward end of the flexible tube 33. At this time, the flexible tube 33 will be flexed in a suitable manner in conformity to the configuration assumed by the internal organ.

If only the knob 34a associated with the lever 34 is now turned upward, as viewed in FIG. 3, the distal end portion 32 will move to the right or in the direction indicated by the arrow R. On the other hand, if it is turned downward, the distal end portion 32 will move to the left or in the direction indicated by the arrow L.

On the other hand, if only the knob 35a associated with the lever 35 is turned upward, as viewed in FIG. 3, the distal end portion 32 will move to the up direction or in the direction indicated by the arrow U, while if the knob is turned downward, the distal end portion will move to the down direction or in the direction indicated by the arrow D. While a movement of the distal end portion in the direction of either arrow R or L or in the direction of either arrow U or D represents a two dimensional oscillating motion, a three dimensional oscillating motion of the distal end portion 32 can be produced by a combined turning of the flexure controlling levers 34 and 35, thus allowing the objective window 41 of the distal end portion 32 to be directed in any desired direction as intended by an operator.

Figure 7:
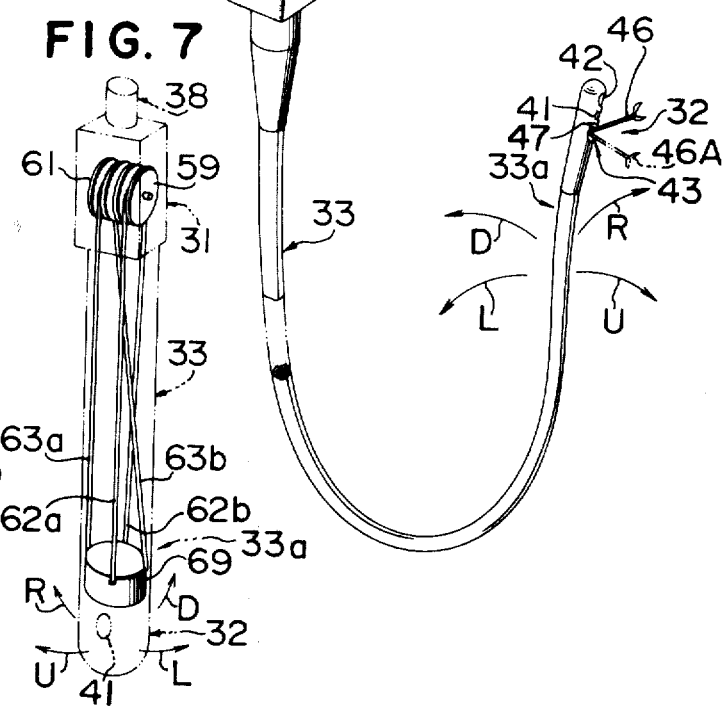

It is also contemplated that only a two dimensional oscillating motion, for example, in the up-and-down direction may be produced by providing only the pulley 59 and wire 62a which are used for the bending operation in the up-and-down direction, so as to be operated by the lever 35 and the knob 35a, as shown in FIG. 7.

A two dimensional or three dimensional oscillating motion in the endoscope according to the invention can be easily achieved by properly operating the knobs 34a and 35a associated with the levers 34 and 35 with the thumb, for example, of the hand which is used to grip the control unit 31. It will be appreciated that the same hand can be used to produce the operations (b), (c), (g), (h) and (j) mentioned above.

While the invention has been illustrated and described with reference to a particular embodiment, it should be understood that other known means can be employed to modify the detail of the particular arrangement shown. It will also be noted that the knob or finger engaging portion to operate the flexure controlling levers may have a spherical, cylindrical, prism or any other configuration.

What is claimed is:

1. An endoscope with facile bending operation comprising a control unit including an eyepiece assembly of an observation optical system; a distal end portion for housing the objective assembly of the observation optical system; a flexible tube for connecting the control unit with the distal end portion and including a bending section at its end nearer the distal end portion, said flexible tube internally housing an optical fiber bundle which provides an optical coupling between the eyepiece and objective assemblies of the observation optical system; a flexure controlling wire having its one end secured to the distal end portion and extending through the flexible tube to the control unit; a pulley having its axle rotatably mounted within and projecting externally of the control unit, the other end of the flexure controlling wire being secured to the pulley; a flexure controlling lever having its one end secured to that portion of the axle of the pulley which projects externally of the control unit, the flexure controlling lever being extended and folded so as to have its free end reach a surface adjoining the surface of the control unit through which the axle projects; and a finger engaging member formed on the free end of the lever and adapted to be operated lengthwise of the control unit to rotate the pulley through the axle.

2. An endoscope according to claim 1 in which the flexible tube internally houses a conduit for passing a processing instrument therethrough, the control unit is provided with an inlet for the processing instrument which communicates with the conduit, and the distal end portion is formed with an outlet for the processing instrument which communicates with the conduit, said inlet being located on a surface of the control unit other than the surface through which the axle of the pulley projects.

3. An endoscope according to claim 1, including a pair of flexure controlling wires in combination with a single pulley and a single flexure controlling lever, thereby allowing a two dimensional oscillating motion of the distal end portion.

4. An endoscope according to claim 1, including two pairs of flexure controlling wires in combination with a pair of pulleys and a pair of flexure controlling levers, thereby allowing a three dimensional oscillating motion of the distal end portion.

5. An endoscope according to claim 1 in which the finger engaging member is provided with means for preventing slippage of an engaging finger.

6. An endoscope according to claim 4 in which the flexure controlling levers have different lengths, and the finger engaging members associated with the respective free end of the levers are located at different positions.

7. An endoscope according to claim 4 in which a pair of pulleys are coaxially located, the axle of one of the pulleys being a hollow shaft fitting over the axle of the other pulley.

8. An endoscope according to claim 1, further including an illumination optical fiber system.

9. An endoscope according to claim 1 in which the conduit is connected with an air supply, a liquid supply and a suction unit to permit each of such functions to be conveyed.

10. A endoscope according to claim 9 in which an air supply, a liquid supply and/or suction unit is disposed on a surface of the control unit other than the surface through which the axle of the pulley projects.

11. An endoscope according to claim 1 in which the control unit is in the form of a quadrangular prism, the axle of the pulley projecting through one of the surfaces, and the flexure controlling lever having its one end secured to the axle having its free end extending and folded at right angles to itself to reach a surface of the control unit which adjoins with the surface through which the axle projects.

* * * * *